United States Patent

Kawaguchi

[11] Patent Number: 5,641,025
[45] Date of Patent: Jun. 24, 1997

[54] AERATOR FOR TURF

[75] Inventor: Kousuke Kawaguchi, Chiba, Japan

[73] Assignee: Maruyama Mfg. Co., Inc., Tokyo, Japan

[21] Appl. No.: 424,121

[22] Filed: Apr. 19, 1995

[30]    Foreign Application Priority Data

| Apr. 19, 1994 | [JP] | Japan | 6-103262 |
| May 31, 1994 | [JP] | Japan | 6-139652 |
| Jul. 11, 1994 | [JP] | Japan | 6-180405 |

[51] Int. Cl.⁶ .................................. A01B 45/02
[52] U.S. Cl. ..................... 172/21; 172/42; 111/200
[58] Field of Search ............................ 172/21, 22, 257, 172/307, 417, 484, 497, 500, 502, 624.5; 111/200, 901; 414/140.7, 140.8; 37/351

[56]          References Cited

U.S. PATENT DOCUMENTS

| 3,012,526 | 12/1961 | Baldwin et al. . | |
| 4,424,868 | 1/1984 | Staniforth et al. | 172/21 |
| 4,776,404 | 10/1988 | Roger et al. | 172/21 |
| 5,101,745 | 4/1992 | Podevels et al. . | |
| 5,119,744 | 6/1992 | Comer . | |
| 5,207,168 | 5/1993 | Comer | 172/21 X |
| 5,398,767 | 3/1995 | Warke | 172/21 |

FOREIGN PATENT DOCUMENTS

| 4505551 | 10/1992 | Japan . |
| 670604 | 3/1994 | Japan . |
| 6165608 | 6/1994 | Japan . |
| 9107077 | 5/1991 | WIPO . |
| 9107078 | 5/1991 | WIPO . |

*Primary Examiner*—Terry Lee Melius
*Assistant Examiner*—Robert Pezzuto
*Attorney, Agent, or Firm*—Cushman, Darby & Cushman, IP Group of Pillsbury Madison & Sutro LLP

[57]          ABSTRACT

The object of the present invention is to provide an aerator for turf which is capable of adjusting the level of the pressing rollers relative to not only the irregularity in its travelling direction but also that in the lateral direction, thus enabling a structure in which a pair of the pressing rollers are rocked, which structure causes an increase in the total weight of the aerator, to be removed. The aerator for turf according to the present invention for injecting high pressure liquid through a plurality of nozzles disposed in its lateral direction in the ground and smoothing ground by a pressing roller after injection, includes a supporting structure for spotting the pressing roller at a frame such that the pressing roller tilts freely relative to the horizontal line in a lateral direction and moves freely vertically relative to the frame, and a biasing structure for biasing the pressing roller downward.

4 Claims, 11 Drawing Sheets

AERATOR FOR TURF

TECHNICAL FIELD

The present invention relates to an aerator for turf which injects high pressure liquid into the turf while travelling on the turf.

BACKGROUND OF THE INVENTION

International Publication WO/91/07078 discloses an aerator which injects high pressure liquid intermittently through a nozzle into the turf to form holes for aerating the turf, and a pressing roller which smooths the injected turf while the aerator travels on the turf.

According to the aerator described in the International Publication WO/91/07078, one pressing roller is provided in the front of and another one at the back of a nozzle system including a plurality of nozzles arranged in the lateral direction of the aerator, respectively, the frontward and backward pressing rollers rock integrally with the nozzle system as viewed from the side of the aerator such that the nozzle system and the pressing rollers are maintained at an appropriate level despite an irregularity on the ground in the travelling direction.

The problems of the aerator in the International Publication WO/91/07078 are as follows.

(a) Although the nozzle system and the pressing rollers follow the irregularity of the turf in the travelling direction of the aerator, they can not follow the irregularity of the turf in the lateral direction of the aerator. Thus the level of the aerator becomes inappropriate if there is such an irregularity in the lateral direction of the aerator.

(b) As mentioned above, one pressing roller is disposed in front of and one at the back of the nozzle system, respectively, and the turf can be easily damaged due to the weight of these rollers. Further, since the degree of smoothing of the ground by the pressing rollers depends on their weight, such weight is preferably increased, thus causing still more damage to the turf.

The conventional aerator for turf also does not possess a special safety function as regards the injection of high pressure liquid through the nozzle.

Since the injection of high pressure liquid through the nozzle involves various dangers, safety measures for preventing erroneous operations by the operator must be adopted. From the safety point of view, the following matters should be taken into consideration.

(c) A nozzle system is lowered to be close enough to the ground to inject high pressure liquid into the ground to a predetermined depth at the injecting operation site, and when the aerator for turf travels on an ordinary road between the storage site and the injecting operation site, the nozzle system is raised to be kept appropriately apart from the ground. In this position where the nozzle system is raised, the injection of high pressure liquid through the nozzle should be prevented.

(d) The aerator for turf travels at a low speed during the injecting operation and at a high speed while travelling on an ordinary road, etc. Except during the injection operation, when the vehicle is travelling, injection of high pressure liquid through the nozzle should be prevented.

(e) In order to avoid an unloaded operation of the pump, the pump should be stopped when the liquid tank becomes empty.

In addition, in a golf course, the aerator for turf injects high pressure liquid such as liquid insecticides into the turf while travelling on the turf at regular intervals or as the occasion may demand. Since such an aerator for turf is equipped with various kinds of oil associated devices, oil may drop onto the turf and damage the turf or soil, if an accident to these oil associated devices of the aerator for turf should occur. In particular, since the appearance and beauty of the green of a golf course is strictly maintained, it is especially important that damage caused by oil leaking from the aerator for turf be prevented.

The conventional aerator for turf does not provide measures for preventing oil from leaking from the oil associated devices with which it is equipped.

SUMMARY OF THE INVENTION

The object of the present invention recited in claim 1 is to provide an aerator for turf which is capable of adjusting the level of the pressing rollers relative to not only the irregularity in its travelling direction but also that in the lateral direction, thus enabling a structure in which a pair of the pressing rollers are rocked, which structure causes an increase in the total weight of the aerator, to be removed.

Another object of the present invention recited in claims 2 and 3 is to provide an aerator for turf which is capable of adjusting the level of the pressing rollers and the nozzle system relative to not only the irregularity in its travelling direction but also those in the lateral direction, thus enabling the structure in which a pair of the pressing rollers are rocked which structure causes the increase in the total weight of the vehicle, to be removed.

Another object of the present invention recited in claims 4 and 5 is to provide an aerator for turf which is capable of effectively preventing the nozzle system and the pressing roller from striking against obstacles by positioning the nozzle system and the pressing roller at an upper position during the aerator's travelling.

Another object of the present invention is to provide an aerator for turf which can achieve the above-mentioned point (c).

Another object of the present invention is to provide an aerator for turf which can achieve the above-mentioned point (d).

Another object of the present invention recited is to provide an aerator for turf which can achieve the above-mentioned point (e).

Another object of the present invention is to provide an aerator for turf which can empty a liquid tank in a safe manner when the injecting operation is completed.

Another object of the present invention is to provide an aerator for turf which can inform the operator of safety of the operating condition of the pump.

Another object of the present invention is to provide an aerator for turf which provides measures for preventing oil leakage onto the turf from the oil associated devices it is equipped with.

Another object of the present invention is to provide an aerator for turf which prevents the leakage oil from the operation seat as well as from the travelling power room serving as the oil associated devices housing room from dropping onto the turf by receiving such leaked oil efficiently.

Another object of the present invention is to provide an aerator for turf which provides measures for preventing oil from leaking onto the turf from the oil associated devices, which measures at the same time do not cause maintenance of the vehicle to be impeded.

Another object of the present invention is to provide an aerator for turf which is capable of collecting the leaked oil smoothly.

Another object of the present invention is to provide an aerator for turf which is capable of limiting damage to the turf even when an oil receiving cover rubs a protrusive portion of the turf during the aerator's travelling.

According to an aerator for turf in claim 1, a pressing roller (78) is subject to the lift up force from the irregularity of ground (114) on which it travels. The lift up force applied from the irregularity in the aerator's lateral direction to the pressing roller (78) functions so as to tilt the pressing roller (78) relative to the horizontal line in its lateral direction. The lift up force applied from the irregularity in the aerator's travelling direction to the pressing roller (78) functions so as to raise the pressing roller (78) against the pressing roller (78)'s own weight and the biasing force by biasing means (102). Since the pressing roller (78) is adapted to move freely vertically relative to a frame (16) and to tilt freely relative to the horizontal line in the lateral direction due to its support by the support means (74,100), the lift up force from the irregularity in the travelling and the lateral directions causes the pressing roller (78) to move vertically and tilt relative to the horizontal line in the lateral direction, whereby each of its end portions in the lateral direction is held in an appropriate level.

According to an aerator for turf in claim 6, a pump (64) remains stopped by a first pump stopping means (128) when a nozzle system (70) is situated at any position except a lower position by a vertical movement driving means (52). This prevents the injection of the high pressure liquid through the nozzle system (70).

According to an aerator for turf in claim 12, oil leaking and dropping from the oil associated devices (130) is received in an oil receiving cover (256) to be stored therein.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENTS

The preferred embodiments will be hereinafter described with reference to the accompanying drawings.

Figure 1:
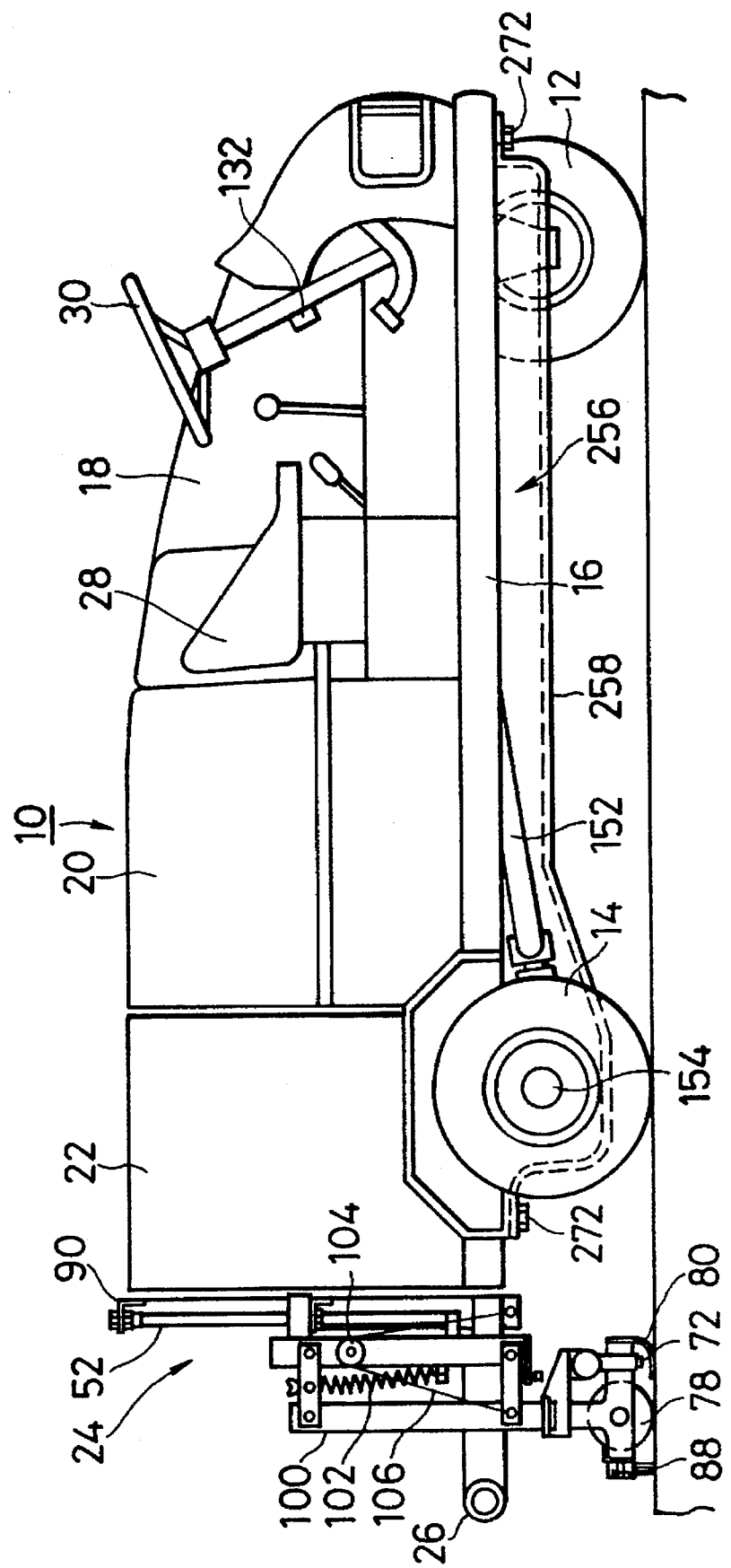
FIG. 1 is a side view of an aerator for turf.

FIG. 1 is a side view of an aerator for turf 10. A front wheel 12 and left and right rear wheels 14 are provided at the center front portion of a frame 16 in the lateral direction and at left and right side rear portions thereof, respectively, to support the frame 16. On the frame 16, in an order starting from the front thereof, are provided an operation seat 18, a fluid tank 20 which stores liquid fertilizers, medical liquid or water and an injecting machine 24. A rear bumper 26 protrudes backward from the frame 16 so as to enclose the injecting machine 24 at both its right and left sides and at its rear at substantially the same level as the frame 16.

Figure 2:
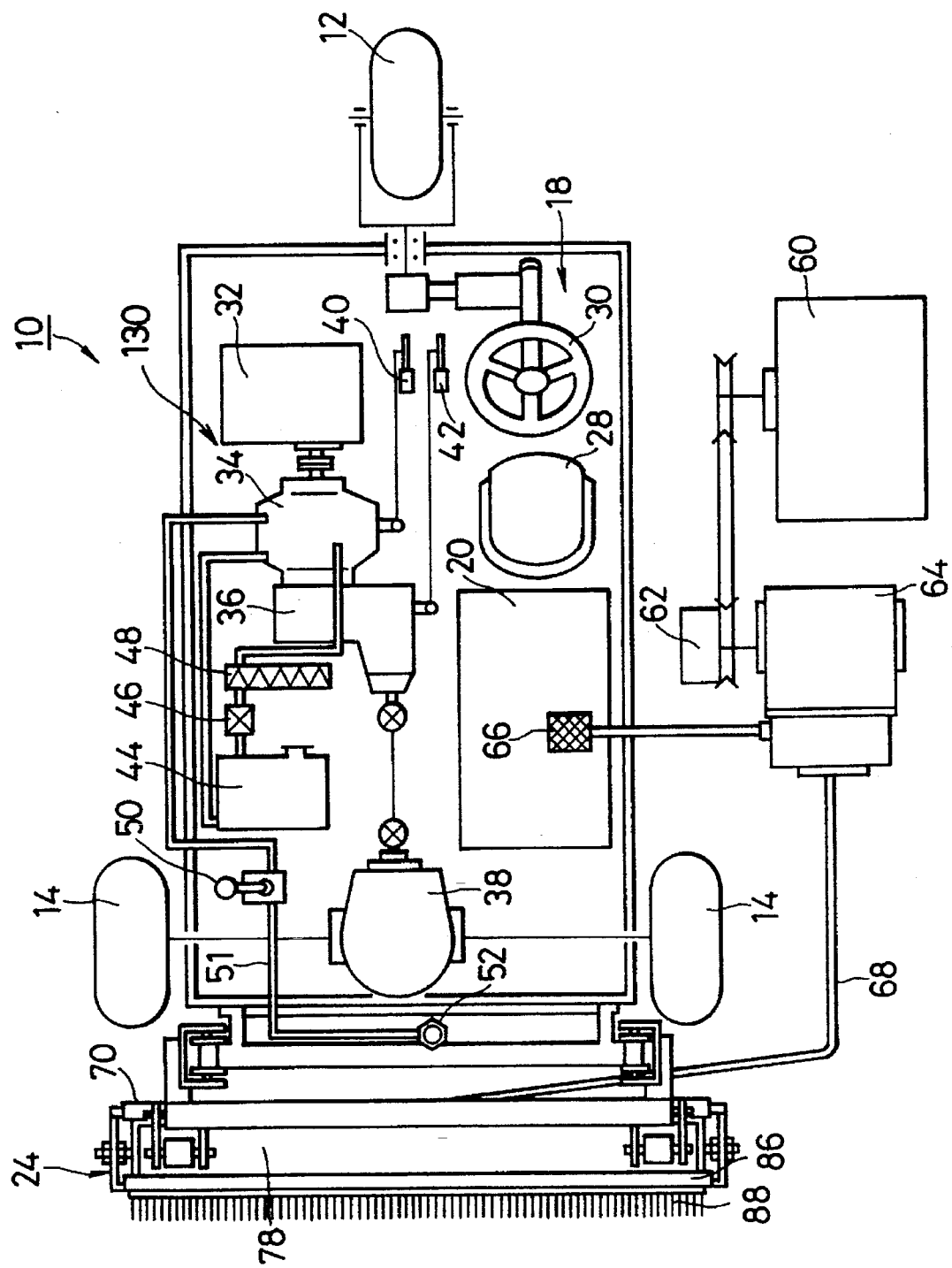
FIG. 2 is a diagrammatic view of the power system of an aerator for turf.

FIG. 2 is a diagrammatic view of the power system of an aerator for turf. At the operation seat 18 are provided a seat 28 for an operator and a steering wheel 30 rotated to steer the aerator for turf 10, the front wheel 12 being adapted to be interlocked with the steering wheel 30 to be steered in response to the rotating operation of the wheel 30. A hydraulic drive device (HST) 34 includes a hydraulic pump and a hydraulic motor (not shown) and is driven by a travelling engine 32 so that the rotational power thereof is transmitted to the right and left rear wheels 14 via a gear speed regulator 36 and a differential system 38. A main lever 40 for regulating speed and a sub lever 42 for regulating speed are provided at the operation seat 18, where the main lever 40 controls the output rotational speed and forward and backward movement of the HST 34, and the sub lever 42 controls the reduction ratio of the gear speed regulator 36 by switching the mating gears thereof. The HST 34 and an oil tank 44 are interconnected with each other by means of a hydraulic circuit. Oil from the HST 34 is cooled by an oil cooler 48 and foreign objects are removed therefrom by a filter 46, the filtered oil then returning to the oil tank 44. A switching valve 50 is connected to a hydraulic cylinder 52 of the injecting machine 24 via an oil passage 51 to control the hydraulic pressure delivered from the HST 34 to the hydraulic cylinder 52. The rotational power of an engine 60 for the injecting machine 24 is transmitted to an intermittent jet pump 64 via a solenoid clutch 62, the intermittent jet pump 64 sucking liquid in a liquid tank 20 via a strainer 66. High pressure liquid discharged from the intermittent jet pump 64 is introduced into a nozzle pipe 70 of the injecting machine 24 via a high pressure hose 68.

The intermittent jet pump 64 is a reciprocating pump which jets liquid intermittently to the high pressure hose 68 by an alternate repetition of a suction stroke and a discharge stroke. In order to increase the discharge pressure, as is described in regard to a reciprocating pump disclosed in the specification and the drawings of the Japanese Patent Application Heisei 6-260462, it is advantageous to adopt a structure in which a non-circular gear is intermated with the drive section, thereby enabling time required for the discharge stroke to be shorter than that required for the suction stroke. Since adoption of this intermittent jet pump 64 enables an intermittent valve and an accumulator, which cause the problem of resistance to abrasion and chemicals, to be removed in order to realize the intermittent jetting of the high pressure liquid from a nozzle 72 (See FIG. 2, etc), which will be described below, liquid containing small particles, for instance, liquid fertilizers or weed killer liquid, can be injected to fertilize and kill weeds at the same time as aerating is performed.

Figure 3:
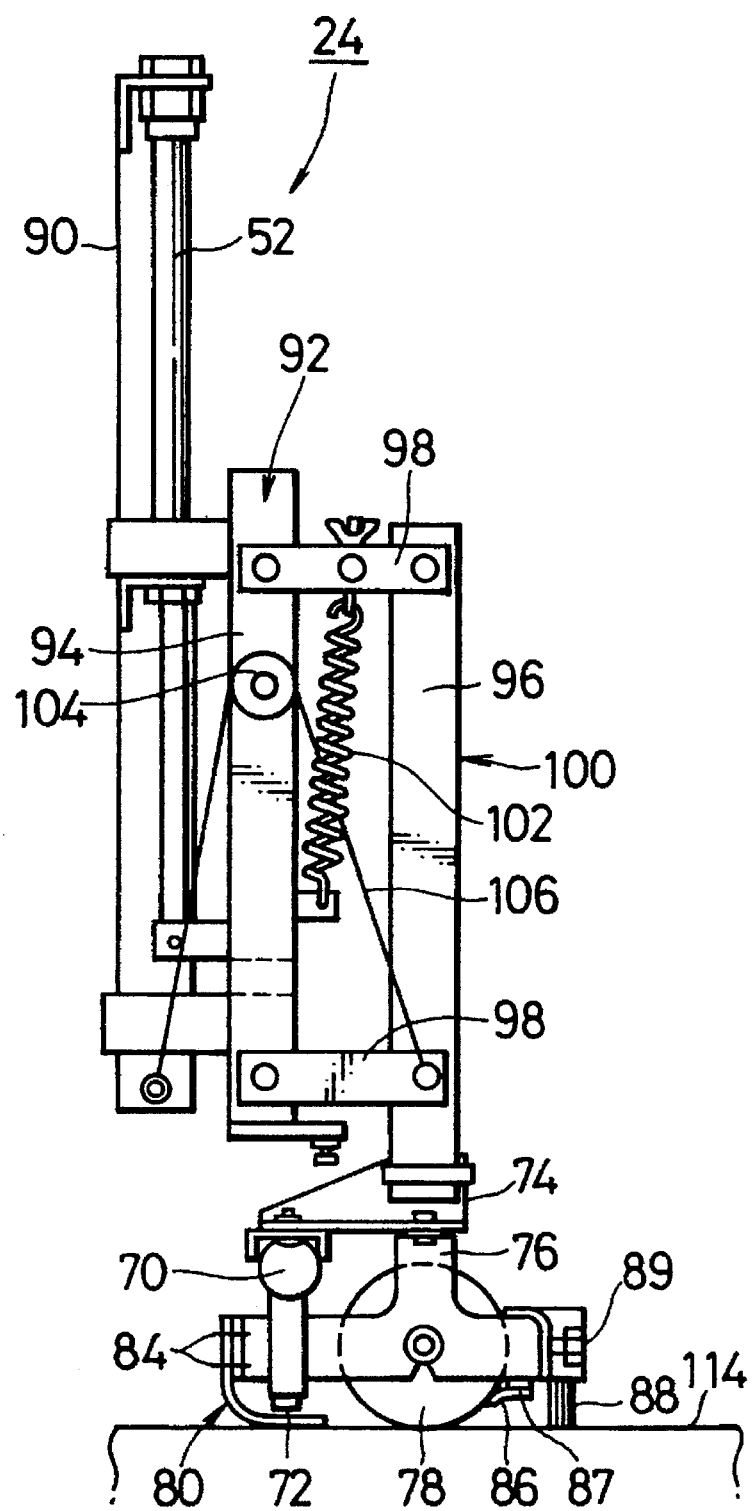
FIG. 3 is a side view of an injection machine.
Figure 4:
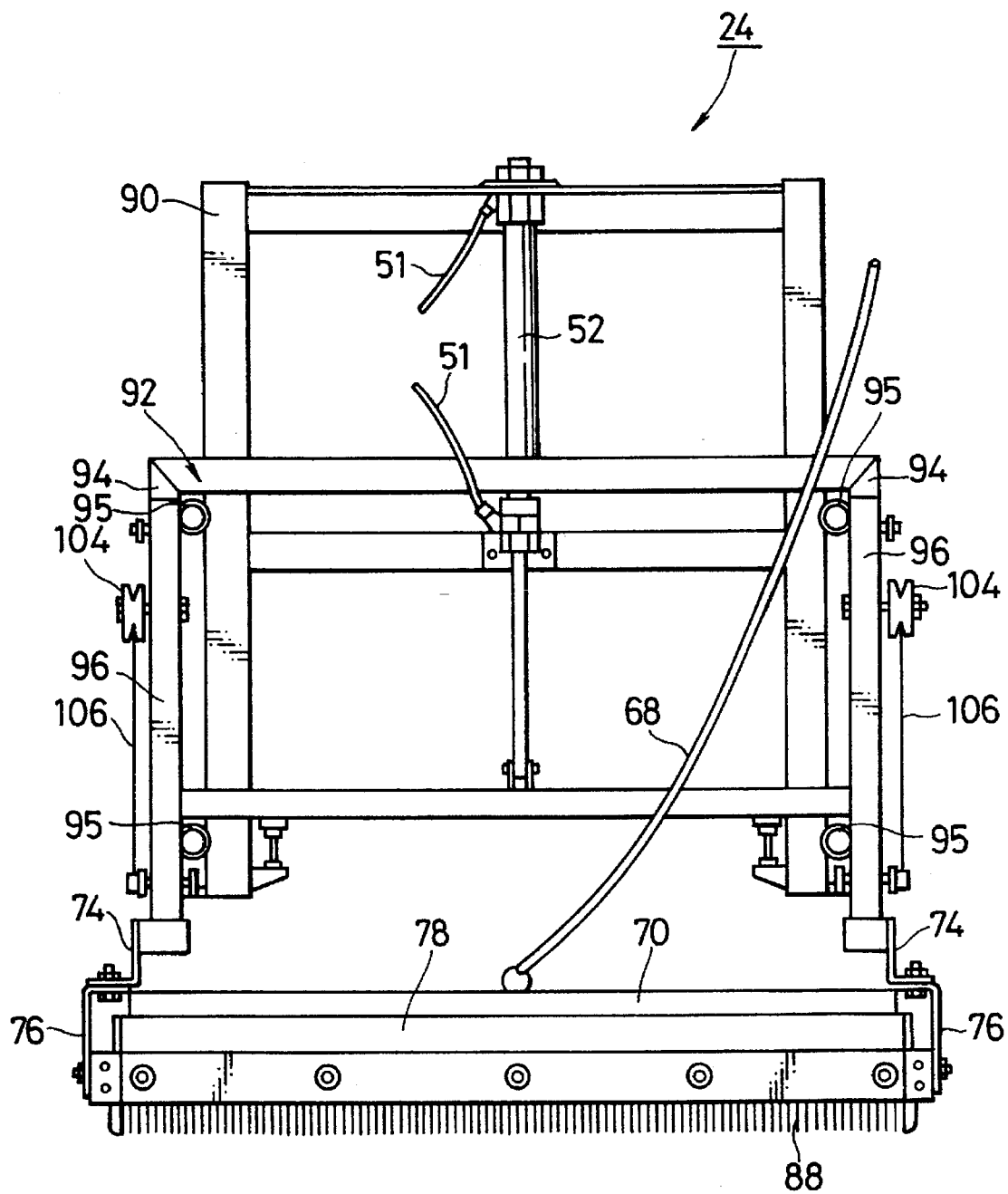
FIG. 4 is an elevational view of the injection machine as viewed from its back.
Figure 5:
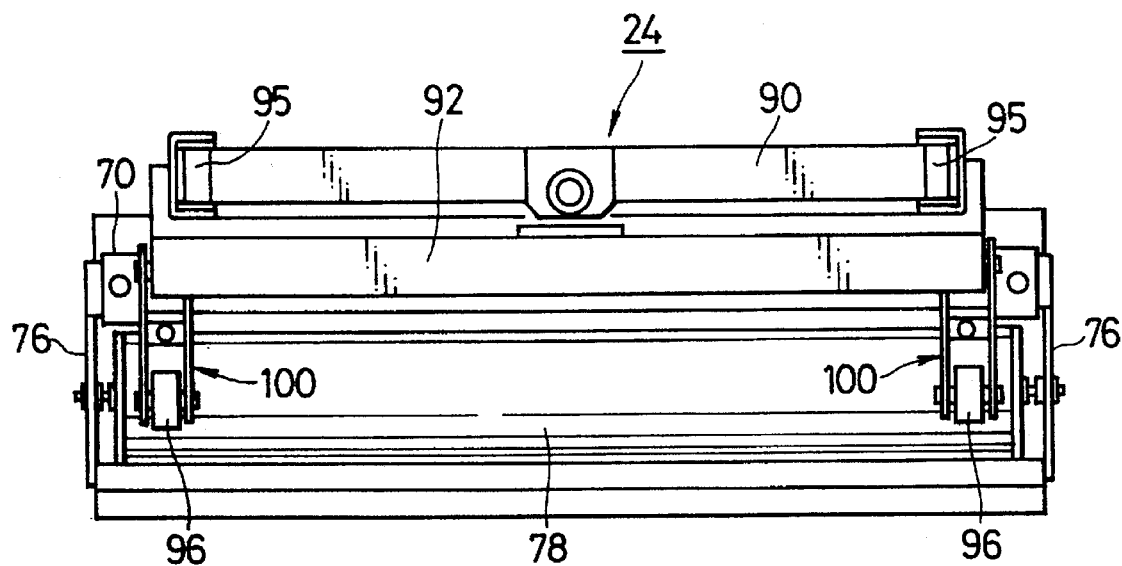
FIG. 5 is a top plan view of the injection machine.

FIGS. 3 to 5 are a side view, an elevational view as viewed from the back, and a top plan view of the injecting machine, respectively. The nozzle pipe 70 extends linearly in the lateral direction and a plurality of nozzles 72 directed downwardly are mounted on the nozzle pipe 70 to be spaced apart at equal intervals along its longitudinal direction in a row. Right and left connecting brackets 74 are attached at their respective front portions to the right and left end portions of the nozzle pipe 70, respectively. A pressing roller 78 extends parallel to the nozzle pipe 70, and is rotatably supported at its right and left end portions to be prevented from coming out of the injecting machine by substantially center parts of right and left roller brackets 76, respectively. Each of the roller brackets 76 is fixed to a rear end portion of one of the connecting brackets 74.

Figure 6:
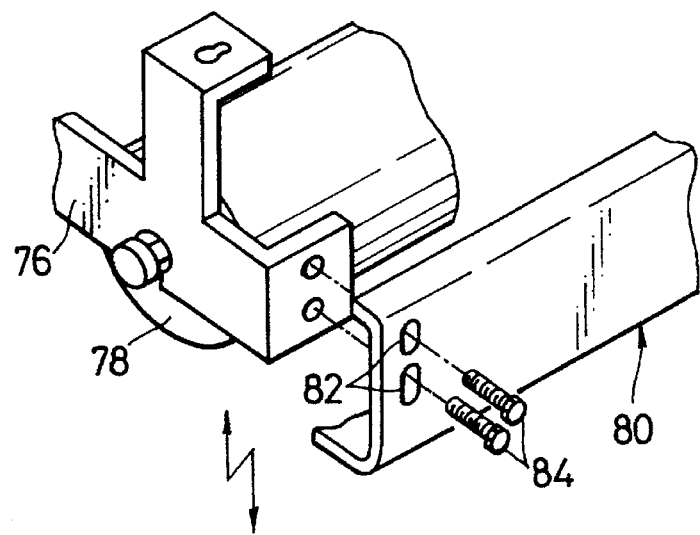
FIG. 6 is a perspective view of a mounting structure of a guard plate with a pressing roller.

FIG. 6 is a perspective view of the mounting structure of a guard plate with a pressing roller. In FIGS. 3 and 6, a guard plate 80 at its right and left end portions has two extending vertical slots 82 located in upper and lower parts thereof, respectively. A bolt 84 extends through each of the slots 82 and is screwed into the front end portion of the roller bracket 76, thereby enabling the guard plate 80 to be fixed to the roller bracket 76. The level of the guard plate 80 can be suitably adjusted by changing the position of the bolt 84 in each of the slots 82. The guard plate 80 covers the area in front of and below the row of the nozzles 72 so that during operation of the aerator for turf 10, the plate 80 slides on turf 114 in front of the nozzles 72 to protect the nozzles 72 from the turf 114, etc. The guard plate 80 has through-holes facing each of the injecting openings of each nozzle 72 through which high pressure liquid from each nozzle 72 is jetted toward the turf 114.

In FIGS. 3 to 5, a scraper 86 extends in the lateral direction along the pressing roller 78 at the rear side thereof and is fixed to the rear end portion of each of the roller brackets 76, while at the same time its tip is held in contact with the pressing roller 78 by an adjusting screw 87 which can adjust the level of the scraper 86. A brush 88 extends parallel to the pressing roller 78 at the rear side of the scraper 86 and is at its right and left end portions level-adjustably fixed to the rear end portion of each of the roller brackets 76 by an adjusting screw 89 to contact the turf 114. The level adjusting of the scraper 86 and the brush 88 by the adjusting screws 87, 89 is identical to that of the guard plate 80 by the bolts 84 in FIG. 6.

A portal stationary frame 90 is uprightly fixed to the rear end portion of the frame 16. Further, a vertical moving frame 92 has vertical side portions 94 at its left and right sides, respectively, each of which is vertically movably supported by the portal stationary frame 90 via guide rollers 95 located on both its sides and both its upper and lower portions. The hydraulic cylinder 52 extends vertically to be connected at its upper and lower ends to the stationary frame 90 and the vertical moving frame 92, respectively, whereby the expansion and contraction of the cylinder 52 enables the vertical moving frame 92 to move vertically with respect to the stationary frame 90. Right and left vertical posts 96 are disposed parallel to the right and left vertical side portions 94, respectively, and upper and lower link bars 98 are pinned to the vertical side portions 94 and the vertical posts 96 by ball joints 108, which will be described below, to allow for three-dimensional independent movement relative to the vertical moving frame 92 within a predetermined limitation. The upper and lower link bars 98 cooperate with the vertical side portions 94 and the vertical posts 96 to form a parallelogram link mechanism 100. Each of right and left tension springs 102 utilized for biasing means is at its opposite ends locked to the middle portion of the vertical moving frame 92 and the upper link bar 98, respectively, to bias the vertical posts 96 downward to automatically return the nozzle pipe 70 and the pressing roller 78 to the position along the horizontal line in the lateral direction due to a balanced biasing force caused by each of the tension springs 102 when the pressing roller 78 is lifted up from the turf 114. Each of the vertical posts 96 is fixed to a corresponding one of the connecting brackets 74 at its lower end portion such that the position thereof in the frontward and backward directions corresponds to the that of the pressing roller 78.

In the illustrated embodiment, each of the tension springs 102 utilized for biasing means engages at its upper end the middle portion of the the upper link bar 98. However, its upper end may instead engage the upper portion of the vertical post 96 so as to bias the vertical post 96 downward by a predetermined biasing force and to achieve an automatic return of the nozzle pipe 70 and the pressing roller 78 to the position along the horizontal line in the lateral direction when the pressing roller 78 is lifted up from the turf 114.

Right and left pulleys 104 are rotatably attached to the right and left vertical side portions 94 of the vertical moving frame 92, respectively, and right and left wires 106 at respective opposite end portions thereof are locked to the lower part of the right and left vertical side portions 94 of the stationary frame 90 and to the coupling portions of the right and left lower link bars 98 via the lower portions of the vertical posts 96, respectively, and they are hooked by pulleys 104 so that their center portions are raised. This results in a large movement of the vertical posts 96 in response to a small upward movement of the vertical moving frame 92, thereby allowing for the quick disengagement of the pressing roller 78, etc.

Figure 7:
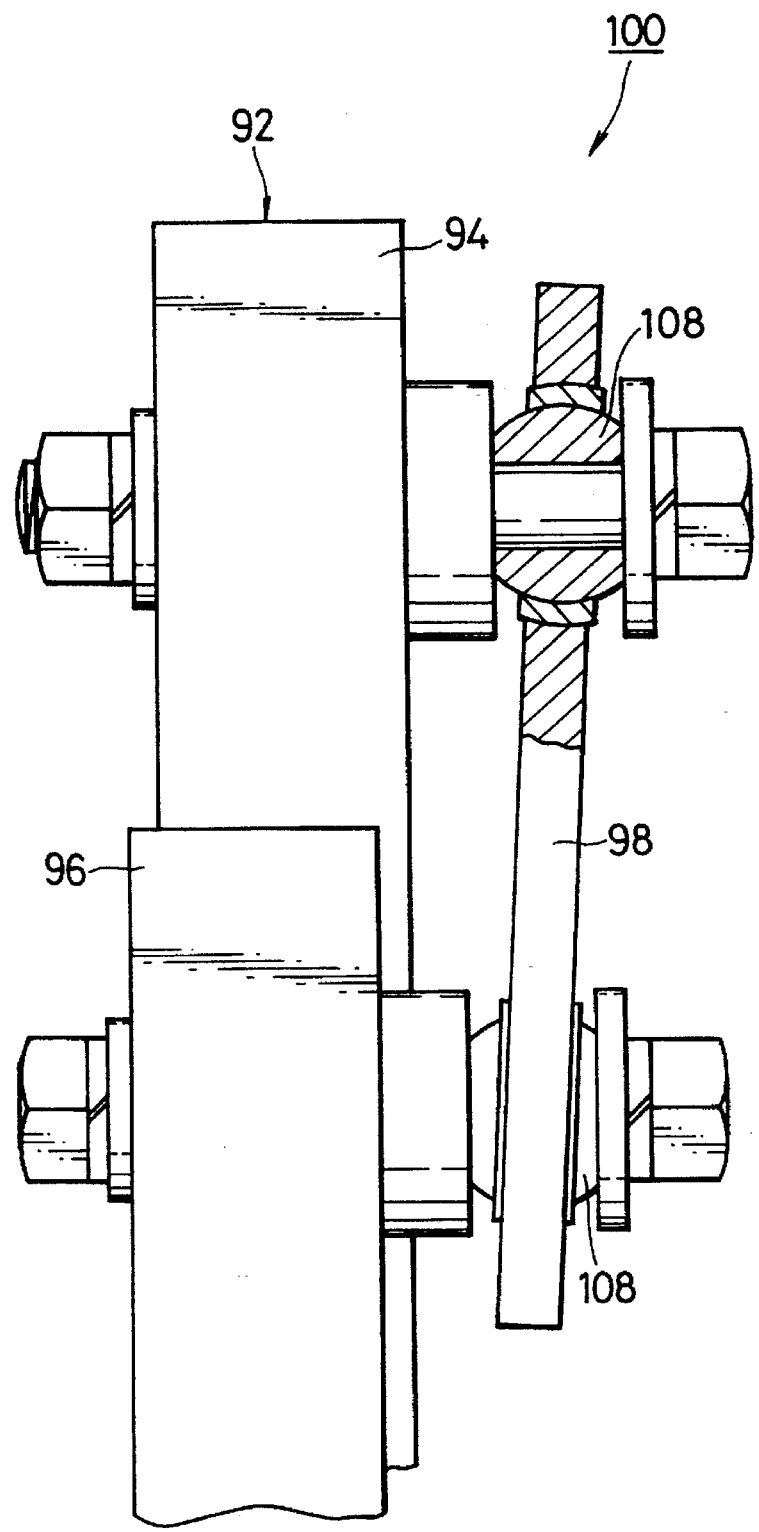
FIG. 7 is a view of a structure for coupling the opposite ends of a link bar with a vertical side portion and a vertical post, respectively, in a parallelogram link mechanism.

FIG. 7 is an illustration of the mechanism for coupling the opposite ends of the link bar 98 with the vertical side portion 94 and the vertical post 96, respectively, in a parallelogram link 100. Each link bar 98 at its front and rear ends is connected to the respective vertical side portion 94 and the vertical post 96 via the respective ball joint 108, respectively. FIG. 7 shows only the coupling mechanism of the left upper link bar 98 at its front and rear ends, however, the respective coupling mechanisms of the other three link bars 98 is similar to the one shown in FIG. 7 in that each link bar is coupled with the respective vertical side portion 94 and the vertical post 96 via the respective ball joint 108. This enables the right and left vertical posts 96 to effect three dimensional movement within the predetermined limitation with respect to the right and left vertical side portions 94, respectively, with one movement being independent of the other one. Resilient members (not shown) such as coil springs are respectively interposed between the vertical posts 96 and the vertical members 94 to bias the vertical posts 96 downward.

Figure 8:
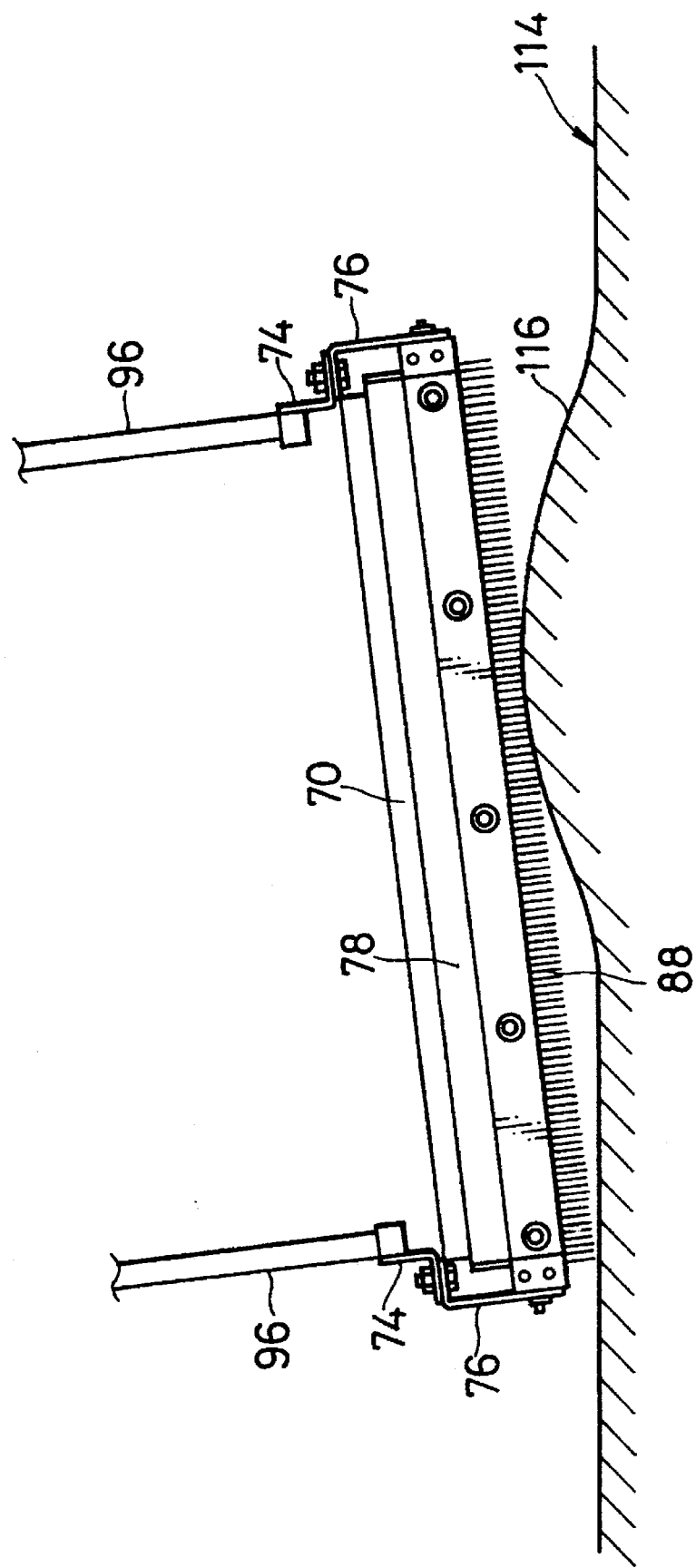
FIG. 8 is a view of a pressing roller in a tilting condition as viewed from its back.

FIG. 8 is an illustration of a tilting condition of a pressing roller as viewed from its back. The parallelogram link mechanism 100 including the ball joints 108 at its grids enables the right and left vertical posts 96 to effect relative vertical movement and to tilt relative to the vertical line. As a result, in a case where there is an undulation 116 on the turf 114 and the pressing roller 78 runs on to the undulation 116 at one end portion thereof in the lateral direction, the level and a tilt angle with respect to the vertical line of the right and left vertical posts 96 change so that the nozzle 72 and the pressing roller 78 tilt relative to the horizontal line in the lateral direction at an appropriate angle, despite the irregularity on the turf 114 in the lateral direction.

Figure 9:
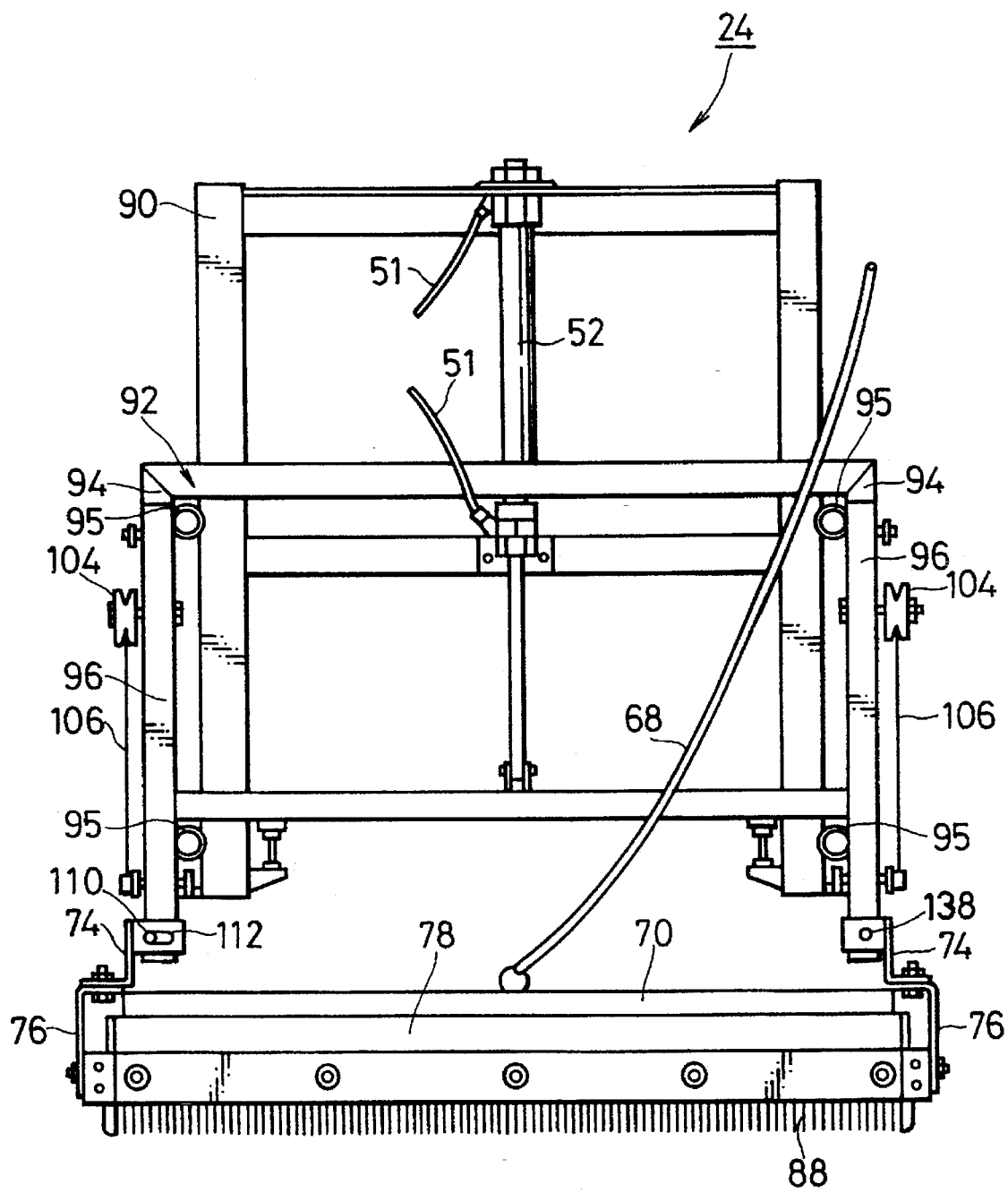
FIG. 9 is an elevational view of the injection machine as viewed from its back, according to an alternative embodiment.
Figure 10:
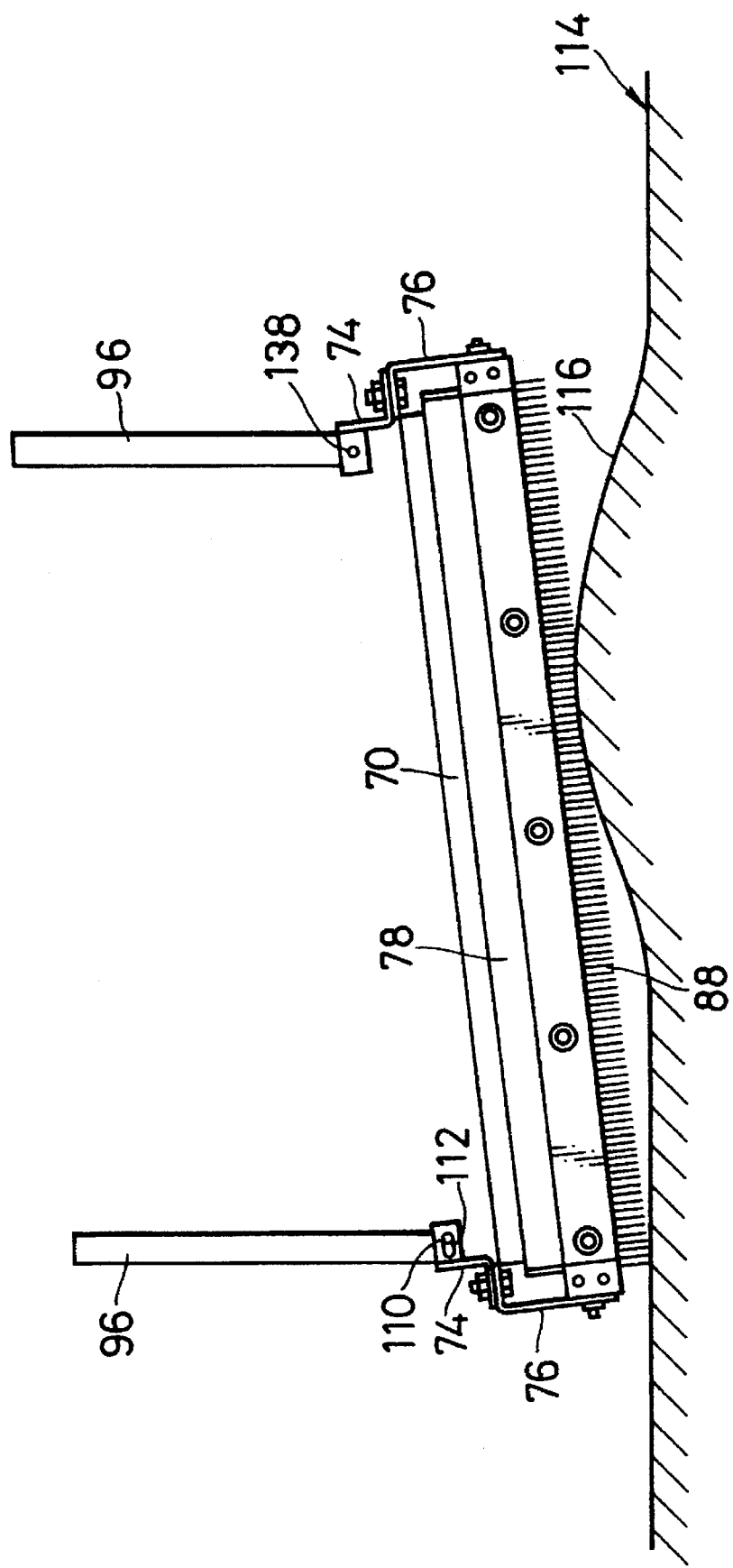
FIG. 10 is a view of a pressing roller in a tilting condition as viewed from its back, according to the alternative embodiment.

FIGS. 9 and 10 are an elevational view of the injecting machine as viewed from its back and a view of a pressing roller in a tilting condition as viewed from its back, respectively, according to the alternative embodiment. In FIGS. 9 and 10, a support pin 138 extends horizontally in the longitudinal direction through the lower end portion of the right vertical post 96 to rotatably support the upper end portion of the right connecting bracket 74. A support pin 110 extends horizontally in the longitudinal direction through the lower end portion of the left vertical post 96 and further extends through frontward and backward slots 112, each of which extends horizontally in the lateral direction at the upper end portion of the left connecting bracket 74. Thus the support pin 110 supports the connecting left bracket 74 rotatably and movably along slots 112, i.e. with its possible movement relative to slots 112. If the undulation 116 is on the turf 114 and the pressing roller 78 at its one end portion in the lateral direction runs on the undulation 116, the right and left connecting brackets 74 move relative to the respective vertical posts 96 so that the nozzle 72 and the pressing roller 78 tilt integrally.

As described above, the engine 32, the HST 34 driven by the engine 32, the gear speed regulator 36 which regulates the rotational output power of the HST 34 at two types of speed, low speed and high speed, the oil cooler 48 for cooling the oil used in the HST 34, the oil tank 44 for storing the oil used in the HST 34 and the like are housed in the travelling power room 130. A hydraulic torque generator 132 (See FIG. 1) is provided in the operation seat 18 to increase the steering force transmitted to the front wheel 12 from the steering wheel 30. The engine 32, the HST 34, the gear speed regulator 36, the oil cooler 48, the oil tank 44 and the hydraulic torque generator 132 all use oil so that there exists the possibility of an oil leakage. A propeller shaft 152 extends below the tank 20 in the longitudinal direction to transmit the rotational force from the gear speed regulator 36 to the differential system 154. The differential system 154 also contains a predetermined amount of oil therein so that there is a danger of an oil leakage from here also.

Figure 11:
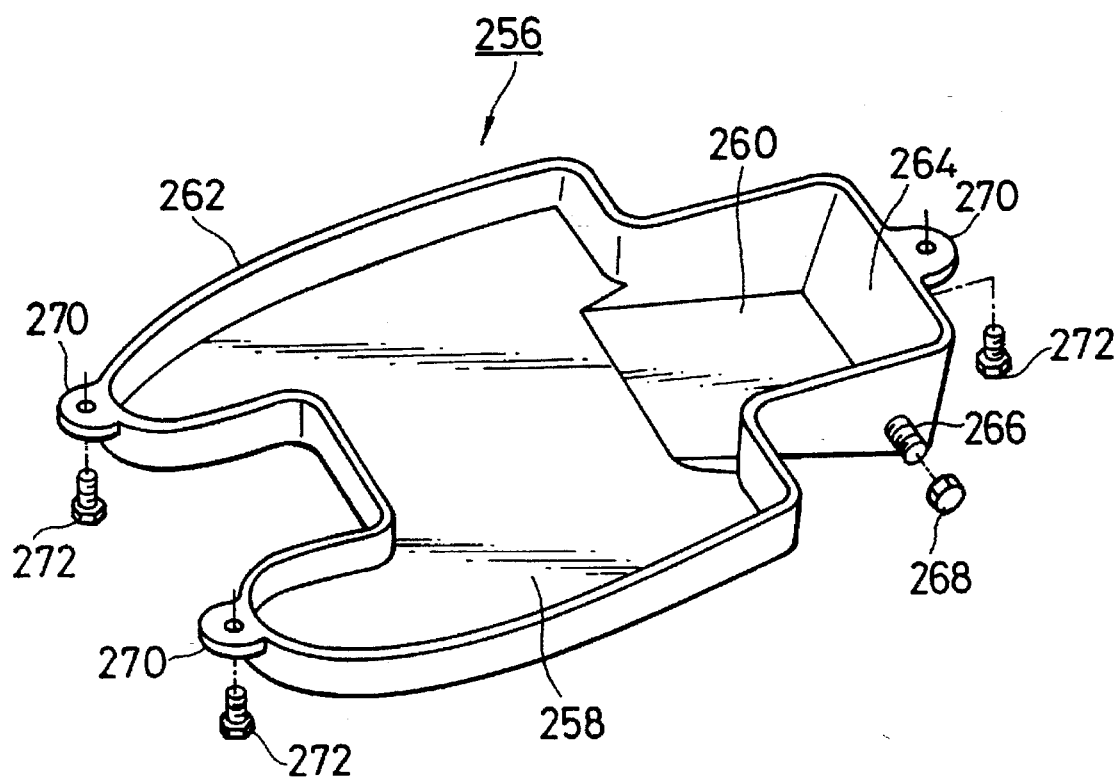
FIG. 11 is a perspective view of an oil receiving bucket.

FIG. 11 is a perspective view of an oil receiving bucket 256. The oil receiving bucket 256 has a horizontal plate portion 258 with a cut-out for the front wheel 12 which covers the area from the lower part of the operation seat 18 and the travelling power room 130 to the substantially front portion of the tank 20 and a slope portion 260 which covers the rear end of the propeller shaft 152 and the lower part of the differential system 154 and slopes at the same angle as the propeller shaft 152. A vertical wall 262 extends along the peripheral edge of the horizontal plate portion 258 and the slope portion 260 and stands upright with its upper surface being arranged in the same level. An oil sump 264 is formed by the slope portion 260 and the part of the vertical wall 262 which stands at the peripheral edge thereof and has a deepest area of the oil receiving bucket 256 at its rear end. A drain 266 is provided at the deepest part of the vertical wall 262 which forms the side wall portion of the oil sump 264 and is opened and closed from the outside by a cap 268. Three protrusion portions 270 are provided at the front right end, the front left end, and the rear middle end of the vertical wall 262, respectively, and protrude from the vertical wall 262 so that their respective upper surfaces are aligned with each other. The upper surface of each protrusion portion 270 of the oil receiving bucket 256 is abutted abuts against the lower surface of the frame 16 to be removably fixed to the frame 16 by a respective bolt 272 extending upwardly through each hole of each of the protrusions 270.

There also provided oil associated devices in the injecting power room 22 which use oil, such as a plunger pump which discharges high pressure liquid intermittently by utilizing the intermittent discharge stroke, an engine which drives the plunger pump and the like. These oil associated devices in the injecting power room 22 are mainly disposed above the oil sump 264 so that the oil sump 264 can receive the oil leaking and dropping from these devices.

If it is difficult to dispose the oil associated devices such as the plunger pump in the injecting power room 22 above the oil sump 264, a horizontal plate portion similar to the horizontal plate portion 258 may be extended backwardly from the slope portion 260 to cover the entire lower part of the injection power room 22 or to only cover the lower part of the main oil associated devices in the injecting power room 22.

The high pressure injecting operation by the aerator for turf 10 will now be described. In the process of injecting liquid intermittently into turf 114, switching of the hydraulic pressure by the switch valve 50 causes the expansion of the hydraulic cylinder 52. This causes the vertical moving frame 92 to be lowered relative to the stationary frame 90, thereby allowing the pressing roller 78 to come into contact with the turf 114. Then, while the aerator for turf 10 travels forward, liquid such as liquid fertilizer, etc. is intermittently pumped into each nozzle 72 via the high pressure hose 68 by the intermittent let pump 64 to be injected into the ground through the nozzle 72 in a highly pressurized form. The guard plate 80 covers an area in front of and below the row of the nozzles 72 during travelling so that it prevents protrusions such as stones on the turf 114 from striking against the nozzles 72 to damage them. Since the guard plate 80 has through holes formed in at least its portion corresponding to the injecting openings of each of the nozzles 72, high pressure liquid injected intermittently from the nozzles 72 passes through the through holes on its horizontal plane portion to be injected into the turf 114, followed by its penetration into the turf 114 while the vertical holes for aerating the turf 114 are being dug. The pressing roller 78 is pressed against the turf 114 by its own weight and the biasing force by the tension springs 102 via the vertical posts 96 to smooth the protrusive portion of the turf 114 created by the injection of high pressure liquid into the turf 114, while rolling on the turf 114 at the back of the nozzles 72. The scraper 86 removes from the pressing roller 78 the mud, etc. deposited thereon by rubbing its tip thereon. The brush 88 brushes the turf 114 after the pressing roller 78 smoothes it.

Since the level of the turf 114 normally differs along the travelling direction of the aerator for turf 10, the distance between the rear wheel 14 and each of the nozzles 72 as well as that between the wheel 14 and the pressing roller 78 gradually changes during travelling of the aerator for turf 10. The connection of the vertical moving frame 92 with the vertical side portions 94 via the parallelogram link mechanism 100 causes the right and left vertical posts 96 to effect respective vertical movement relative to the right and left vertical side portions 94 of the vertical moving frame 92, one of the vertical movements being independent of the other one, and the pressing roller 78 is held in contact with the turf 114, whatever the distance between the rear wheel 14 and the nozzle 72 as well as that between the wheel 14 the pressing roller 78 may be, by an appropriate pressing force caused by the roller 78's own weight and the biasing force applied by the tension spring 102.

As illustrated in FIG. 8, in a case where the level of the turf 114 differs in the lateral direction due to the undulation 116, the lift up force from the undulation 116 is applied to the pressing roller 78 and then the pressing roller 78 is subject to the tilting force relative to the horizontal line in the lateral direction such that the vertical post 96 on the lifted up side of the roller 78 is raised. This tilting force is transmitted to all the link bars 98 via the right and left vertical posts 96 to make the ball joints 108 located at the rear and front end portions of each link bar 98 pivot, whereby the right and left vertical posts 96 tilt against the horizontal line in the lateral direction, being integral with the pressing roller 78, so that the nozzle pipe 70 and the pressing roller 78 tilt such that respective end portions thereof on the side of the undulation 116 are set higher than the other respective end portions on the non-undulation side.

According to the alternative embodiment, as shown in FIG. 10, in case the level between the left side of the turf and right side thereof differs due to the undulation 116, the lift up force applied to the pressing roller 78 from the undulation 116 causes the vertical post 96 on the side of the roller 78 which has run on the turf to be raised and the right connecting bracket 74 rocks about the support pin 138 and the left connecting bracket 74 effects a relative vertical and horizontal movement with respect to the right one due to the movement of the support pin 110 along the slot 112 and rocking of the left bracket 74 about the support pin 110 to rock relative to the left vertical post 96, whereby the pressing roller 78 tilts such that its end on the undulation side is set higher than its end on the non-undulation side.

During travelling, if there should occur a leak of oil from the oil associated devices such as the HST 34, the oil cooler 48 and the like, some oil leaks and drops from the oil associated devices in the operation seat 18 and the travelling power room 130 and is received into the horizontal plate portion 258, some oil leaks and drops from the oil associated devices in the differential system 154 and the injecting power room 22 and some oil comes downwardly from the higher part of the propeller shaft 152 and is received into the slope portion 260, all of which oil is stored in the bucket 256 to be prevented from dropping onto the turf 114. The oil received into the horizontal plate portion 258 is made to flow toward the oil sump 264 by gravity to be stored therein. When leakage oil is to be discharged from the oil receiving bucket 256, the cap 268 is removed from the oil receiving bucket 256 and discharged oil is transferred from the oil receiving bucket 256 into the container such as a bucket.

Upon maintenance and servicing of the devices in the travelling power room 130, the bolts 272 are loosened and the oil receiving bucket 256 is removed from the frame 16. After the operation, the oil receiving bucket 256 is mounted on the frame 16 again.

Except during the injecting operation for high pressure liquid, when the aerator for turf 10 travels, the hydraulic cylinder 52 is contracted by switching the hydraulic pressure by means of the switching valve 50. This causes the vertical moving frame 92 to be raised, thereby enabling the roller bracket 76 to be raised. Furthermore, the raising of the vertical moving frame 92 permits each of the wires 106 to move to its stationary frame side through the pulley 104 and the link bar 98 on the vertical post side rocks upwardly relative to the link bar 98 on the the vertical side portion side. When the pressing roller 78 is lifted up from the turf 114, the tilting force on the pressing roller 78 from the right and left irregularities on the turf 114 is no longer applied. Furthermore, since the right and left vertical posts 96 are not only biased downward by the right and left tension springs 102, respectively, but also biased thereby toward the center of in the lateral direction with the right and left biasing forces being balanced, the force applied to each ball joint 108 on the right side from the right vertical post 96 is equal to the one applied to each ball joint 108 on the left side from the left vertical post 96 so that the level of one of the right and left vertical posts 96 becomes equal to the level of the other and the nozzle pipe 70 and the pressing roller 78 return to the position along the horizontal line in the lateral direction. At the final upper position of the vertical moving frame 92, all the components including the nozzles 72, the pressing roller 78 and the like mounted under the connecting bracket 74 are adapted to be situated above the line between the horizontal portion of the rear bumper 26 in the lateral direction and the rear wheel 14. As a result, during travelling of the aerator for turf 10, the nozzles 72, the pressing roller 78, the guard plate 80 and the like are surrounded on the outside by the rear bumper 26, which prevents them from striking directly not only against obstacles on the ground, but against the ground at the beginning of ascending a slope as well as at the end of decending the slope.

Figure 12:
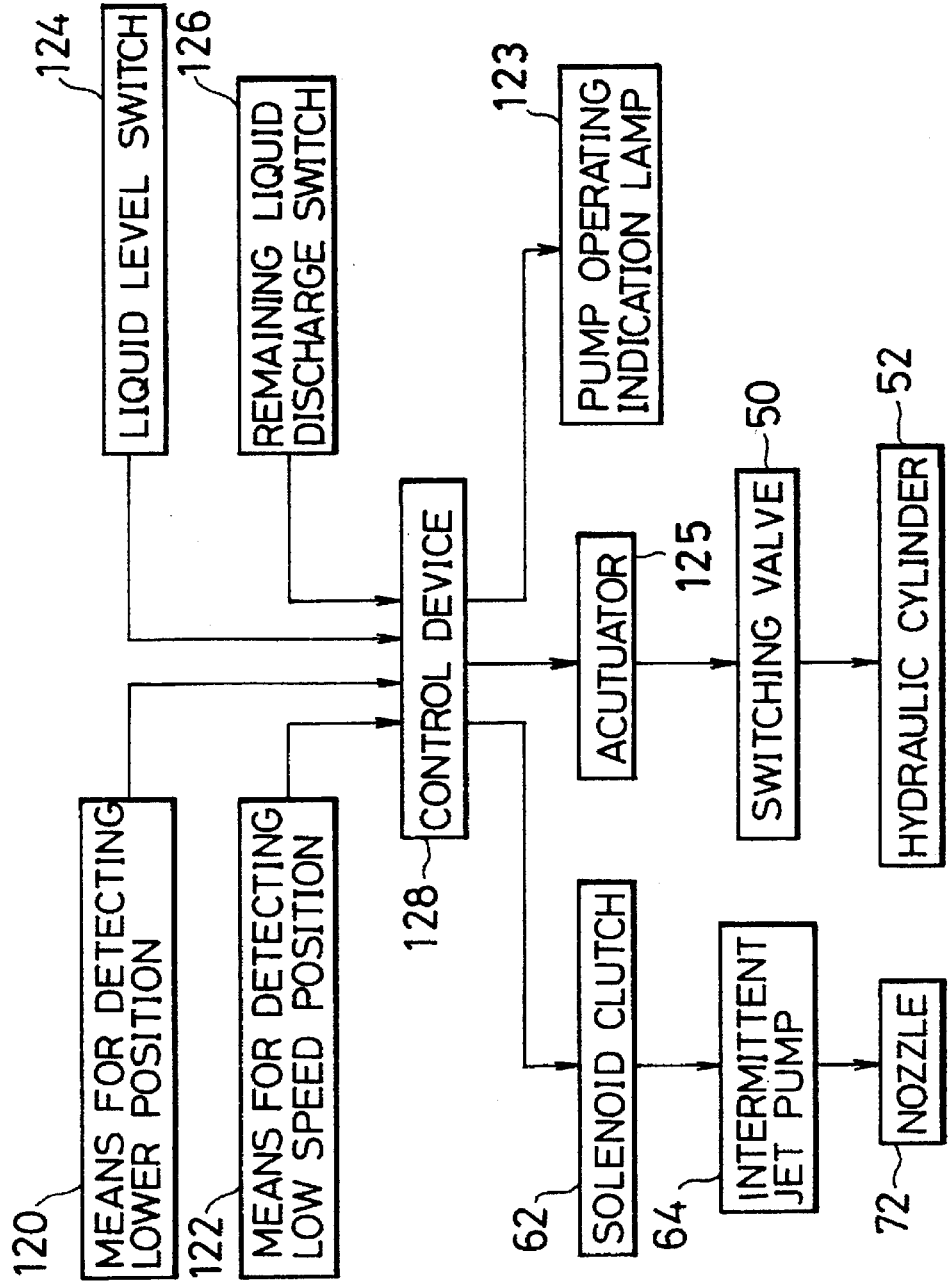
FIG. 12 is a diagrammatic view of a control system of a hydraulic cylinder and an intermittent jet pump.

FIG. 12 is a diagrammatic view of the control system of the hydraulic cylinder 52 and the intermittent jet pump 64. Means for detecting the lower position 120 is mounted on the vertical moving frame 90 to detect whether the vertical moving frame 92, which is moved vertically relative to the stationary frame 90 by the expansion and the contraction of the hydraulic cylinder 52, is situated at the lower position by means of it contacting the vertical moving frame 92. Means for detecting the low speed position 122 detects the low and high speed positions of the sub lever 42 for regulating speed. In the injecting operation, since the aerator for turf 10 needs to travel under a substantially low speed, the sub lever 42 for regulating speed is switched into the low speed position which defines the travelling range for the injecting operation. When the aerator for turf 10 travels on an ordinary road to move between the injecting site and the storage site, the sub lever 42 for regulating speed is switched into the high speed position which defines the travelling range for transporting such that the aerator for turf 10 travels under a substantially high speed. A liquid level switch 124 detects whether the level of the liquid in the liquid tank 20 is greater than zero and less than the level extremely close to zero. A remaining liquid discharge switch 126 is manually operated by the operator of the aerator for turf 10 when the liquid in the liquid tank 20 is to be fully discharged. A control device 128 receives the input signals from the means for detecting the lower position 120, means for detecting the low speed position 122, the liquid level switch 124 and the remaining liquid discharge switch 126 to control the solenoid clutch 62, an actuator 125 and a pump operating indication lamp 123. The actuator 125 controls the expansion and the contraction of the hydraulic cylinder 52 by switching the switching valve 50. The pump operating indication lamp 123 is disposed in the operating seat 18 and indicates that the solenoid clutch 62 is switched on, or the intermittent jet pump 64 is under operation.

In a high pressure liquid injecting operation into the turf 114, (a) in order for the aerator for turf 10 to travel under low speed, the sub lever 42 for regulating speed needs to be switched into the low speed position.

(b) in order to ground the pressing roller 78, the vertical moving frame 92 needs to be lowered to the lower position by the expansion of the hydraulic cylinder 52 through a manual operation of the switching valve 50.

(c) in order to avoid the unloaded operation of the intermittent jet pump 64, the level of the liquid must be more than a predetermined value such that it can be injected from the nozzle 72 in the liquid tank 20.

The control device 128 judges the above conditions (a) through (c) from respective input signals from the means for detecting the lower position 120, means for detecting the low speed position 122, and the liquid level switch 124. In a case where any of the conditions (a) through (c) is not fulfilled, the solenoid clutch 62 is switched off to cause a non-energized state. This results in the solenoid clutch 62 being disconnected so that the intermittent jet pump 64 remains stopped, since the rotational power from the operational engine 60 is not transmitted thereto, whereby prevention of injection of high pressure liquid from the nozzle 72 is assured.

In a case where the liquid level of the liquid tank 20 is lowered during the injecting operation in which high pressure liquid is injected from the nozzle 72 so that the condition (c) is not fulfilled, the control device 128 disconnects the solenoid clutch 62 to stop the injection of high pressure liquid from the nozzle 72 and it also switches the position of the switching valve 50 via the actuator 125 after switch-off of the solenoid clutch 62 to contract the hydraulic cylinder 52, thereby moving the vertical moving frame 92 to the upper position.

Thereafter, when the operator of the aerator for turf 10 turns on the remaining liquid discharge switch 126 in order to empty the liquid tank 20, the control device 128 switches the position of the switching valve 50 via the actuator 125 to expand the hydraulic cylinder 52, thereby moving the vertical moving frame 92 to the lower position. After the means for detecting the lower position 120 detects that the vertical moving frame 92 has moved to the lower position, a built-in timer is activated by the control device 128 to measure the predetermined time during which the solenoid clutch 62 is energized, regardless of the input signal from the liquid level switch 124. As a result, the intermittent jet pump 64 is operated during that predetermined time to discharge the liquid in the liquid tank 20 through the nozzle 72, whereby the liquid tank 20 is made emptied. Then, the control device 128 switches the position of the switching valve 50 via the actuator 125 again to contract the hydraulic cylinder 52, thereby returning the vertical moving frame 92 to the upper position.

Whereas preferred embodiments of the invention have been illustrated and described in detail, it will be apparent that various changes may be made in the disclosed embodiments without departing from the scope of the invention.

What is claimed is:

1. An aerator for turf comprising:
   (a) a nozzle system including a plurality of nozzles extending in a direction transverse with respect to a longitudinal axis of the aerator to inject high pressure liquid into the ground;
   (b) a pressing roller for smoothing the ground after high pressure liquid is injected through said nozzles;
   (c) a supporting means for supporting said nozzle system and said pressing roller at a frame such that said nozzle system and said pressing roller tilt freely relative to a horizontal line in said transverse direction and move freely vertically relative to the frame;
   (d) a biasing means for biasing said nozzle system and said pressing roller downward thereby pressing said pressing roller against the ground.

2. The aerator for turf in accordance with claim 1, wherein said supporting means includes right and left attachment members attached to respective right and left end portions of said nozzle system and said pressing roller and to respective left end portions of said nozzle system (70) and said pressing roller, respectively, right and left vertical members disposed at positions near said pressing roller and corresponding to said right and left attachment members, respectively, which extend vertically to be coupled with respective attachment members at each lower end portion such that said nozzle system and said pressing roller tilt freely relative to the horizontal line in the transverse direction, and right and left vertical elements disposed at a position near the frame and corresponding to said right and left vertical members, respectively, to cooperate with said respective vertical members to define a parallelogram link mechanism.

3. The aerator for turf in accordance with claim 2, wherein said right and left vertical elements disposed near said frame are coupled with each other and are moved vertically relative to said frame by a vertical movement driving means, a bumper is disposed to enclose said nozzle system and said pressing roller at an upper position of said vertical elements.

4. The aerator for turf in accordance with claim 3, further including a forcible rocking means for rocking said vertical members forcibly upwardly relative to said vertical elements such that said nozzle system and said pressing roller are situated above a line between said bumper and a wheel at the upper position of said vertical elements.

* * * * *